United States Patent [19]

Geurts

[11] 4,236,583
[45] Dec. 2, 1980

[54] TOGGLE LINK TRIP AND RESET MECHANISM FOR EARTHWORKING TOOL

[75] Inventor: Cletus J. Geurts, Ridgeland, Wis.

[73] Assignee: Geurts Inc., Minneapolis, Minn.

[21] Appl. No.: 2,699

[22] Filed: Jan. 11, 1979

[51] Int. Cl.³ ............................................. A01B 61/04
[52] U.S. Cl. .................................... 172/266; 74/520; 172/570
[58] Field of Search ............... 172/264, 265, 266, 267, 172/268, 705, 710, 570; 74/520; 108/81

[56] References Cited

U.S. PATENT DOCUMENTS

| | | | |
|---|---|---|---|
| 310,821 | 1/1885 | Hench et al. | 172/266 |
| 642,510 | 1/1900 | Tuttle et al. | 172/268 |
| 2,316,447 | 4/1943 | McFall | 108/81 |
| 2,724,315 | 11/1955 | Roberson | 172/265 |
| 2,944,613 | 7/1960 | Anderson | 172/266 |
| 3,084,749 | 4/1963 | Anderson | 172/268 |
| 3,275,086 | 9/1966 | Morris | 172/266 |
| 3,321,027 | 5/1967 | Johnson et al. | 172/266 |
| 3,483,930 | 12/1969 | Detwiller et al. | 172/267 |
| 3,550,690 | 12/1970 | Quanbeck | 172/265 |
| 3,586,110 | 6/1971 | King | 172/269 |
| 3,760,882 | 9/1973 | Geurts | 172/265 |
| 3,765,492 | 10/1973 | Irwin | 172/266 |
| 3,787,133 | 1/1974 | Geurts | 403/284 |
| 3,901,326 | 8/1975 | Geurts | 172/264 |
| 3,949,814 | 4/1976 | Ralston | 172/267 |
| 4,040,491 | 8/1977 | Dietrich | 172/269 |
| 4,054,177 | 10/1977 | Quanbeck | 172/267 |
| 4,068,723 | 1/1978 | Quanbeck | 172/267 |
| 4,116,280 | 9/1978 | Rehn et al. | 172/266 |
| 4,116,281 | 9/1978 | Lant | 172/267 |
| 4,128,130 | 12/1978 | Green et al. | 172/266 |
| 4,182,196 | 1/1980 | Glass | 74/520 X |

*Primary Examiner*—Richard T. Stouffer
*Attorney, Agent, or Firm*—Burd, Bartz & Gutenkauf

[57] ABSTRACT

A moldboard plow bottom unit having a frame mount on a beam. A standard attached to a moldboard plow bottom is pivotally connected to the frame to provide movement of the moldboard plow bottom from a normal earthworking position to an elevated trip position. A trip and reset mechanism having a toggle link assembly connected to the standard operates to allow the standard and plow bottom to move up to a trip position and to bias the standard and plow bottom to the earthworking position. The trip and reset mechanism includes a control member pivotally mounted on the frame and connected to the toggle link assembly. The control member has first and second members which selectively engage opposite sides of one link of the toggle link assembly to control the movement of the toggle link assembly between its extended over-center position to its folded position. Springs mounted on the frame and connected to the control member yieldably hold the toggle link assembly in the extended over-center position and bias the standard toward the earthworking position.

45 Claims, 8 Drawing Figures

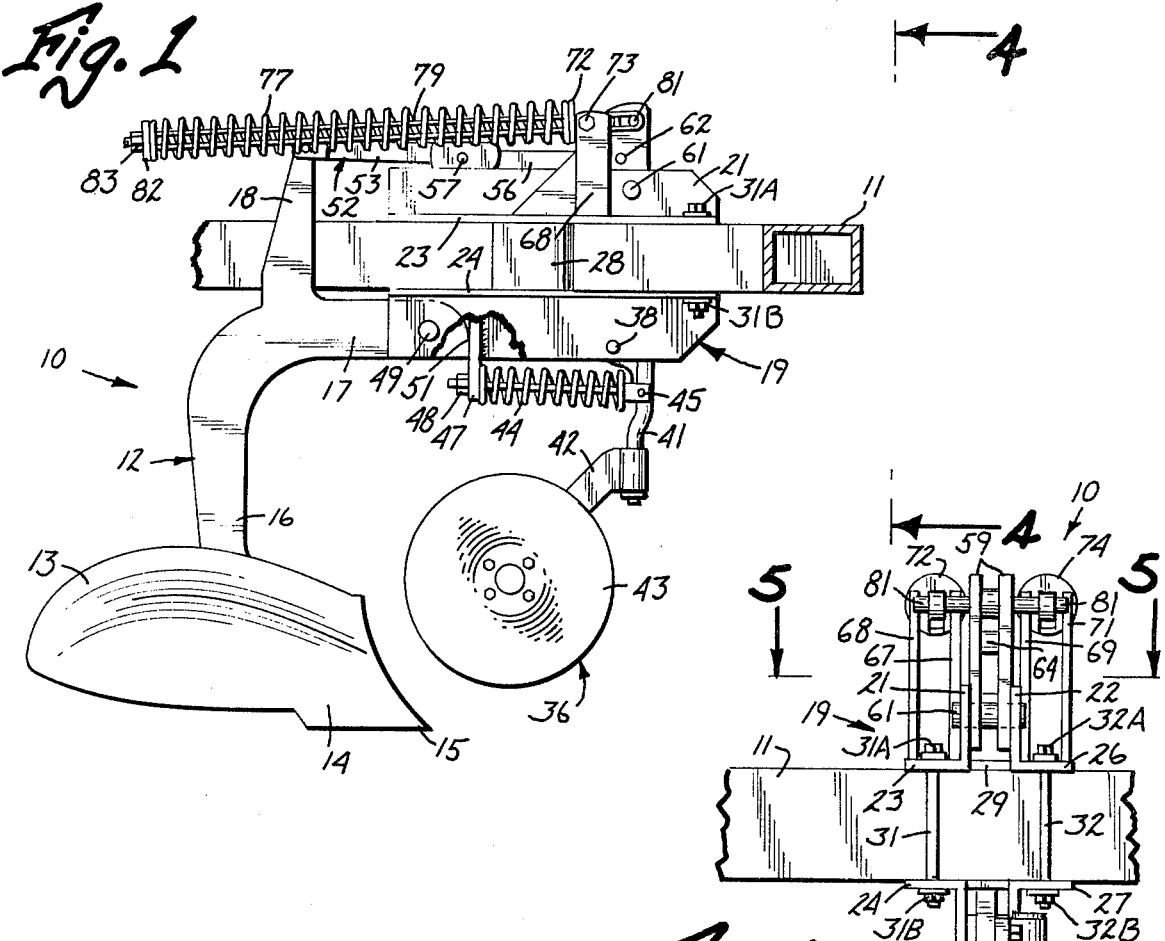
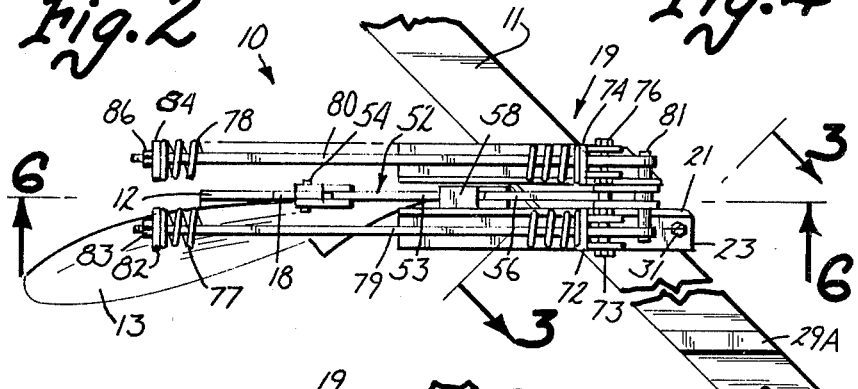
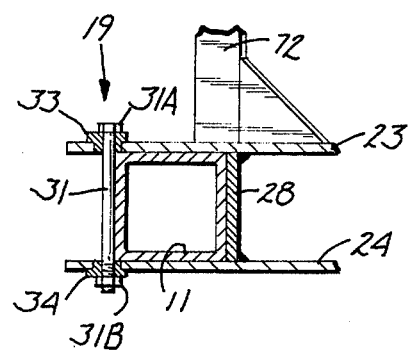

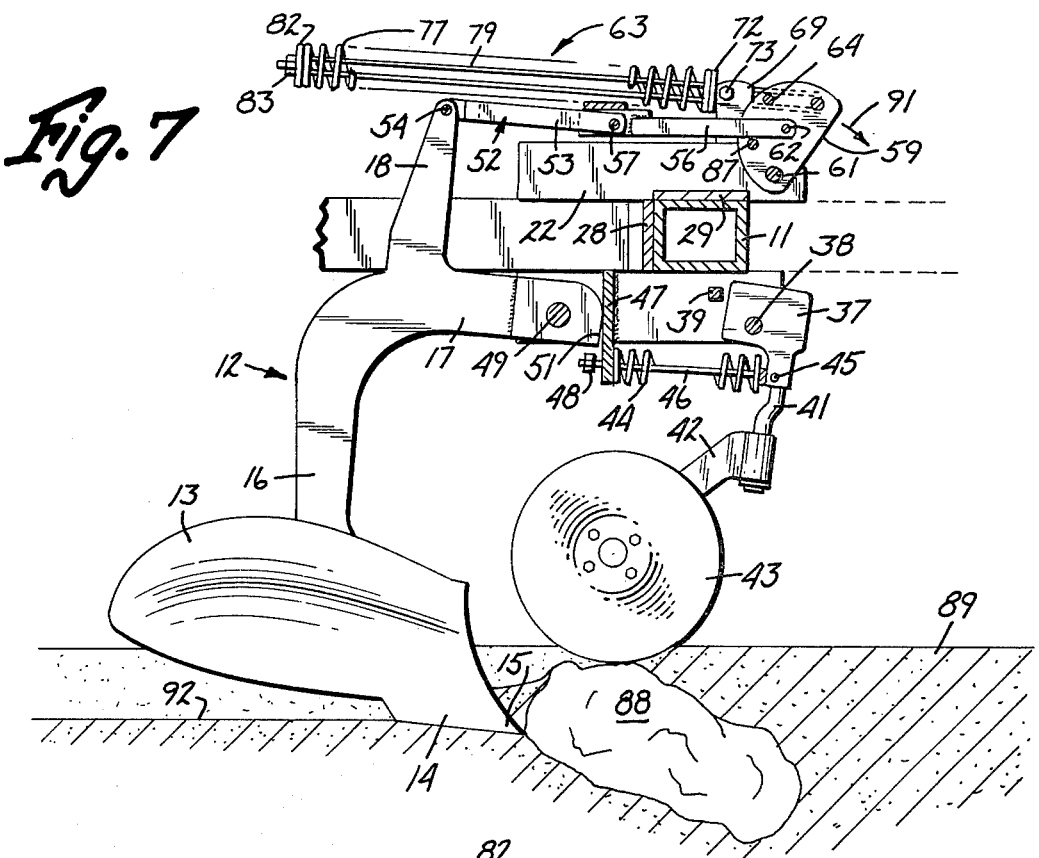
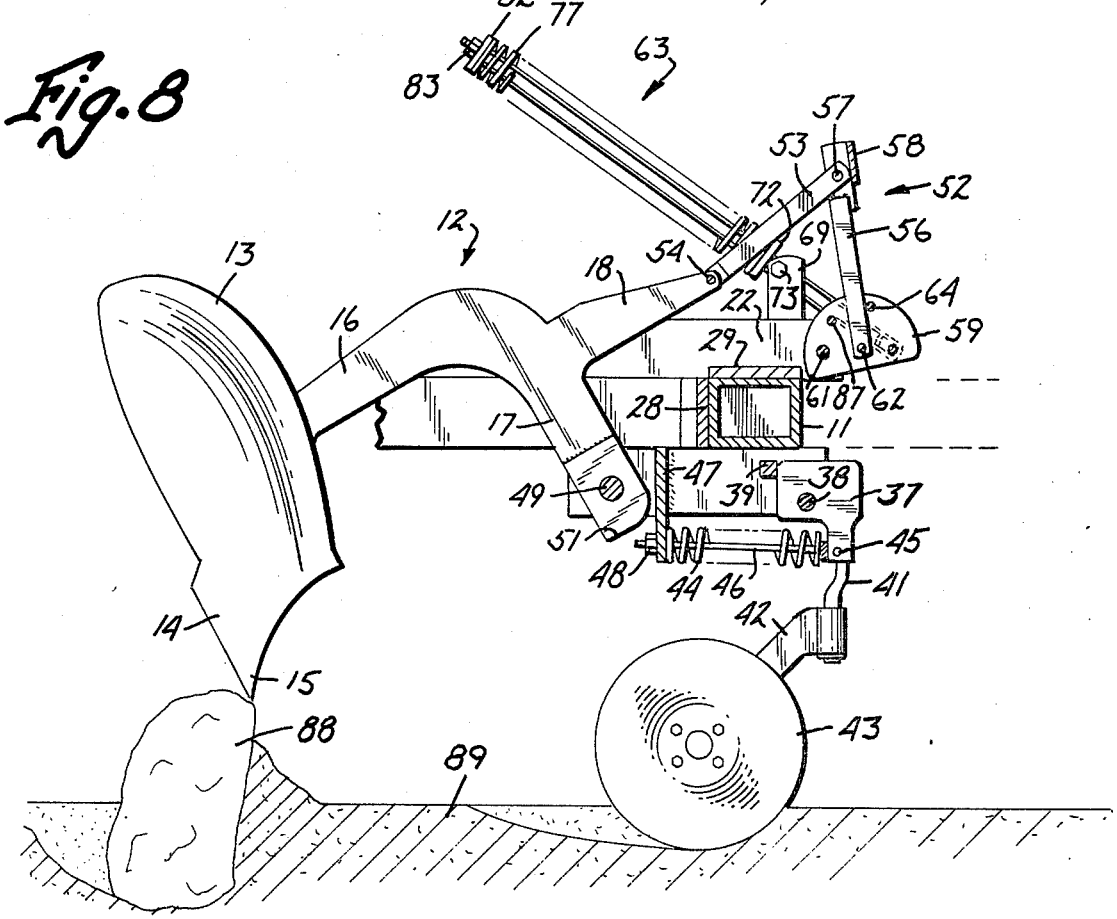

TOGGLE LINK TRIP AND RESET MECHANISM FOR EARTHWORKING TOOL

SUMMARY OF INVENTION

The invention generally relates to an implement having one or more earthworking tools that can move from a normal earthworking position to an up trip position to allow the tools to move over obstructions, such as rocks. The implement has a trip and reset mechanism that operates in conjunction with a toggle link assembly to control the movement of the earthworking tool from the normal earthworking position of the tool to an up trip position and back to the earthworking position.

The implement includes a plow bottom unit having a frame clamped to a beam. The frame cooperates with clamp means operable to vertically and horizontally mount the frame on the beam. The clamp and positioning structure for mounting the frame on the beam is disclosed in U.S. Pat. No. 3,787,133.

A standard is pivotally connected to the frame to allow an earthworking tool attached to the standard to move upwardly to a trip position and back down to a ground earthworking position. The standard has an upwardly directed arm pivotally connected to the toggle link assembly. When the toggle link assembly is in its extended over center position, the standard and earthworking tool secured thereto are in the normal earthworking position. The standard has a forward end which cooperates with a stop secured to the frame to limit the down or the earthworking position of the tool.

The trip and reset mechanism has control means pivotally mounted on the frame and attached to the toggle link assembly. The control means has a first and second means that engage opposed portions of the toggle link assembly to control its movement between the over center extended position and its folded position. Biasing means mounted on the frame and connected to the control means function to bias the control means to yieldably move the toggle link assembly to the extended over center position. When a tool hits an obstruction, the toggle link assembly moves the control means against the force of the biasing means. The control means, after a predetermined movement thereof, will act on the toggle link assembly to break the over center extended condition of the toggle link assembly. Once the toggle link assembly folds, the biasing force on the control means acting through the toggle link assembly is reduced thereby allowing the tool to move upwardly against a reduced amount of force to ride over an obstruction, such as a rock in the ground. Once the tool is over the rock, the biasing means forces the toggle link assembly back to its over center extended position. This moves the earthworking tool back to its earthworking position. The trip and reset mechanism operates to reset the tool in its earthworking position without raising the plow, nor stopping the forward movement of the plow to minimize the breakage and damage to the earthworking tool, as well as the standard. The operation of the trip and reset mechanism is mechanical and automatic. These and other objects and advantages of the trip and reset mechanism for an earthworking tool are embodied in the drawings and detailed description.

IN THE DRAWINGS

FIG. 1 is a side elevational view of a moldboard plow bottom unit mounted on a beam and equipped with a plow bottom trip and reset mechanism;

FIG. 2 is a top view of FIG. 1;

FIG. 3 is an enlarged sectional view taken along the line 3—3 of FIG. 2;

FIG. 4 is a front elevational view of FIG. 1 taken along the line 4—4 looking in the direction of the arrows;

FIG. 7 is a sectional view similar to FIG. 6 showing the plow bottom and coulter in engagement with a rock; and FIG. 8 is a sectional view similar to FIG. 7 showing the plow bottom in its trip position riding over the rock.

DESCRIPTION OF PREFERRED EMBODIMENT

Figure 5:
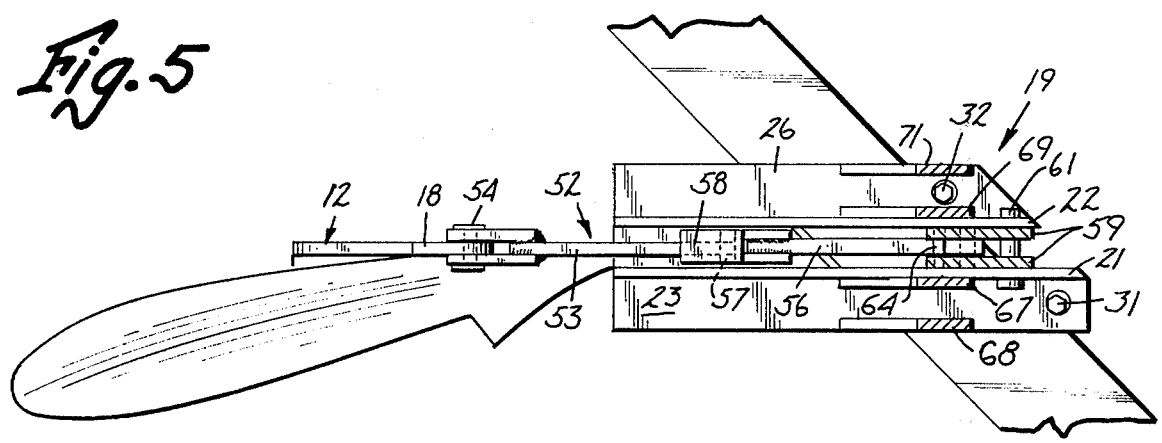
FIG. 5 is a sectional view taken along the line 5—5 of FIG. 4.

Referring to FIGS. 1 and 2, there is shown a plow bottom unit indicated generally at 10 mounted on a beam 11 of a moldboard plow. Beam 11 is a conventional box-type beam which extends diagonally from the front of the plow to the rear of the plow. An example of a moldboard plow having a main beam is shown in U.S. Pat. No. 3,586,110.

Plow bottom unit 10 has a standard 12 connected to an earthworking tool 13, shown as the moldboard plow. The moldboard plow has a moldboard and a replaceable plowshare 14. Other types of earthworking tools, such as lister plows, chisel plows and furrowing tools, and sub-soil tools can be mounted on standard 12.

Standard 12 is a one-piece cast metal member having a downwardly directed first section 16 joined to a forwardly directed section 17. An upright arm 18 extends upwardly from a rear portion of forward section 17. Arm 18 is in general vertical alignment with the general center of earthworking tool 13. Arm 18 is located along a general upright line forward of section 16.

A mounting frame indicated generally at 19 connects the standard to the beam 11. Referring to FIGS. 1 to 4, mounting frame 19 is clamped onto beam 11 without the use of bolts extending through beam 11 or welding of frame parts to beam 11. Mounting frame 19 comprises a pair of upright plates 21 and 22 located in side-by-side positions. Plates 21 and 22 have horizontal slots to accommodate beam 11. First plate 21 has a horizontal top flange 23 engaging the top of beam 11 and a horizontal bottom flange 24 engaging the bottom of beam 11. Second plate 22 has an outwardly directed horizontal top flange 26 in engagement with the top of beam 11 and a horizontal outwardly directed bottom flange 27 in engagement with the bottom of beam 11. A back plate 28 is secured to flanges 23, 24, 26, and 27 and engages the upright back of beam 11. As shown in FIG. 4, a spacer block 29 secured by welds or the like to the top of beam 11 is located between plates 21 and 22. Block 29 serves as a positioning and guide structure to facilitate the location of the plow bottom unit 10 on beam 11. FIG. 2 shows a second spacer block 29A used to located a second plow bottom unit on beam 11. Beam 11 has additional spacer blocks in accordance with the number of plow bottom units that are attached to the beam 11.

Returning to FIGS. 3 and 4, nut and bolt assemblies 31 and 32 are used to clamp flanges 23 and 24 and 26 and 27 to the upper and lower sides of beam 11. Bolts 31 and 32 extend through eccentric washers 33 and 34, as shown in FIG. 3. Eccentric washers 33 and 34 are rotated to horizontally clamp frame 19 to beam 11. Bolt 31 has a head 31A in engagement with the top eccentric washer 33 and a nut 31B in engagement with the bottom eccentric washer 34. Bolt 32 has a similar head 32A and a nut 32B. The horizontal and vertical clamp arrangement to mount a plow bottom carrying frame to a beam is disclosed by Geurts in U.S. Pat. Nos. 3,787,133 and 3,901,236.

Figure 6:
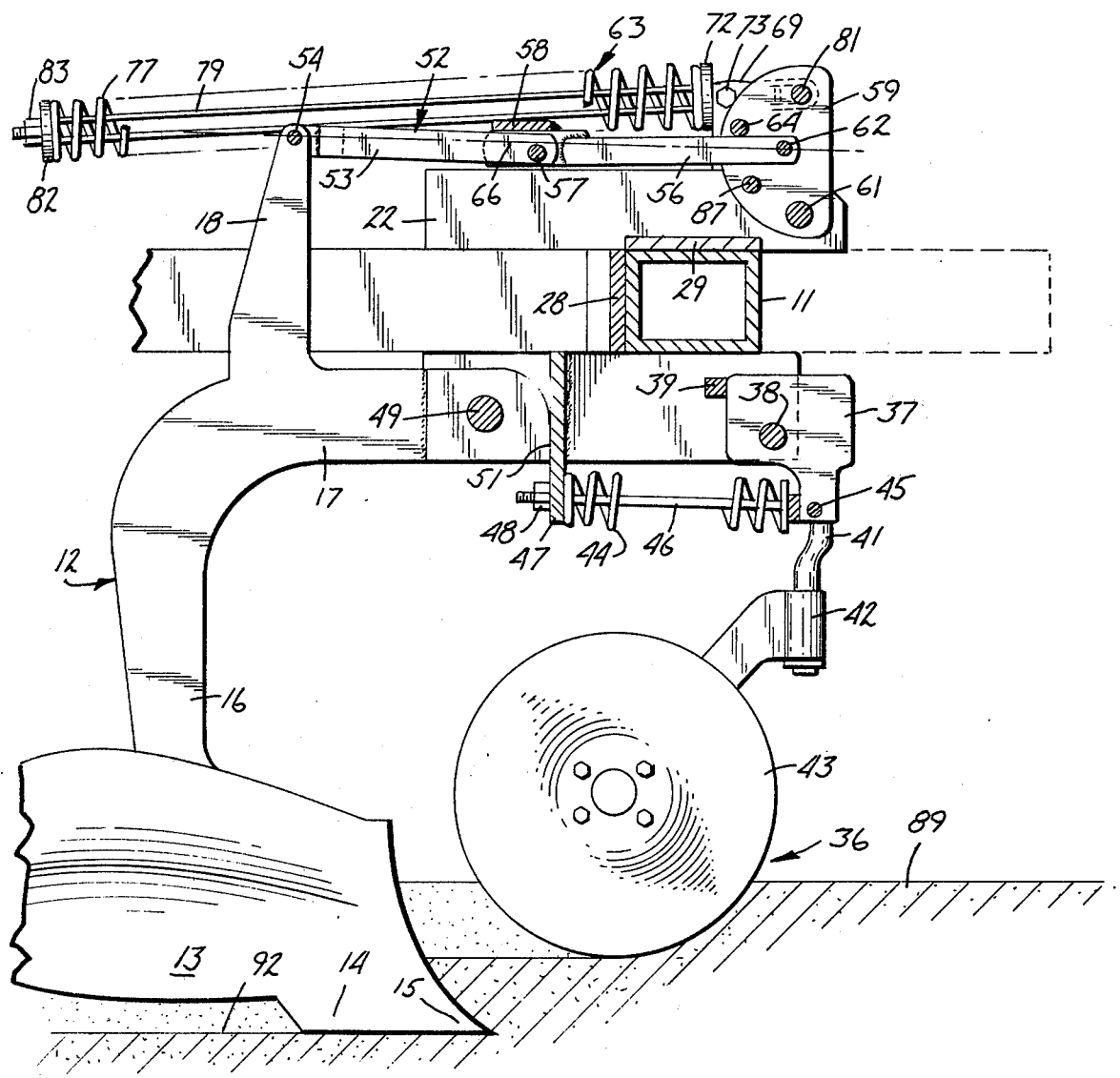
FIG. 6 is an enlarged sectional view taken along the line 6—6 of FIG. 2 with the plow bottom in its normal earthworking position.

Referring to FIGS. 1 and 6, a coulter unit indicated generally at 36 is located in front of moldboard plow bottom 13 in general longitudinal alignment with the leading edge of the moldboard. Coulter unit 36 has a crank member 37 pivotally connected to plates 21 and 22 with transverse pivot pin 38. An upper rear portion of crank member 37 engages a stop 39 secured to plates 21 and 22 when coulter disc 43 is in its normal earthworking position. Disc 43 is connected to crank member 37 with a downwardly directed dog leg shank 41 and an arm 42. Arm 42 is rotatably mounted for rotation about a generally upright axis on the lower end of shank 41. A horizontal bearing (not shown) rotatably connects disc 43 to the lower end of arm 42. Disc 43 is biased toward an earthworking position with a spring 44. Spring 44 is located about a holding rod 46. The forward end of rod 46 is pivotally connected with pivot pin 45 to a lower portion of crank member 37. The rear end of spring 44 bears against a fixed stop plate 47 so that spring 44 functions as a compression spring yieldably holding disc 43 in its earthworking position. Rod 46 extends through a hole (not shown) in the lower part of plate 47. A nut 48 threaded on rod 46 engages the rear side of plate 47 and is used to adjust the tension of spring 44. Plate 47 extends upwardly between first and second plates 21 and 22 and is welded thereto.

The forward end of standard 17 is pivotally connected to plates 21 and 22 with a heavy transverse pivot pin 49. Pin 49 is rotatably mounted in suitable holes in plates 21 and 22. Pin 49 is in general vertical alignment with point 15 of plowshare 14 when moldboard plow bottom is in its earthworking position. The forward end of the horizontal section 17 of the standard has a stop edge 51 that abuts against stop plate 47 when moldboard plow bottom 13 is in the normal earthworking position. The forward end portion of standard section 19 is enlarged to fill the space between frame plates 21 and 22. The plow bottom trip and reset mechanism, hereinafter described, functions to bias forward edge 51 into engagement with plate 47 whereby plate 47 serves as a stop which determines the normal earthworking position of plow bottom 13.

As shown in FIGS. 1, 2, 5, and 6, trip and reset mechanism has a toggle link assembly indicated generally at 52 operable to hold standard 12 in its normal earthworking position. Toggle link assembly 52 will break or move to a folded position, as shown in FIG. 8, to allow moldboard plow 13 to ride over a fixed obstruction, such as a rock. Toggle link assembly 52 comprises a first rigid link 53 pivotally connected to the upper end of the standard arm 18 with pivot pin 54. Link 53 has a bifercated rear end accommodating the opposite ends of pin 54. A second rigid link 56 extended forwardly from first link 53 is pivotally joined to link 53 with pivot pin 57. A stop plate 58 is secured to an upper portion of link 56.

Stop plate 58 engages the top of link 53 when pin 57 is in a down over center position and links 53 and 56 are in their elongated or extended end-to-end position. The forward end of link 58 is pivotally connected to a crank member or control means 59. Crank member 59, comprises a pair of semi-circular shaped plates that are pivotally connected to the forward ends of the first and second plates 21 and 22 with a transverse pivot pin 61. A pivot pin 62 pivotally connects the approximate mid or center section of crank member 59 to the forward end of link 56. A biasing means indicated generally at 63 is connected to crank member 59 to bias crank member 59 in a rearward direction whereby crank member 59 transmits a rearward biasing force to toggle link assembly 52 to hold standard 12 in its normal earthworking position. Biasing means 63 yieldably urges a first control pin 64 into engagement with a portion of the top of the second link 56 to bias link 56 in a downward direction. This forces the center pivot pin 57 to a position below the center line 66 horizontally passing through the axes of pins 54 and 62. Center pivot pin 57 is in the down over-center position in FIG. 6. This position is determined by stop plate 58 which engages the top of a portion of first link 53.

As shown in FIG. 4, rigid upwardly directed anchor arms 67, 68, 69, and 71 extend upwardly from flanges 23 and 26, respectively. Anchor arms 67, 68, and 69, 71 serve as two fixed supports for the forward ends of a pair of compression springs 77 and 78. A saddle 72 is pivotally connected to the upper end of arms 67 and 68 with a transverse bolt 73. A second saddle 74 engages the upper end of anchor arms 69 and 71 and is pivotally connected thereto with a bolt 76. The forward end of spring 77 engages saddle 72. The forware end of spring 78 engages saddle 74. A first rod 79 extended through spring 77 is attached to a transverse pin 81 secured to crank member 59 shown in FIG. 6. Rod 79 is an elongated slotted member that extends around pin 81 and concentrically through spring 77. The rear end of rod 79 accommodates a washer 82 and nut 83. Nut 83 is adjustable to vary the tension of spring 77. a second slotted rod 80 extends concentrically through spring 78 and around pin 81. The rear end of rod 80 carries a washer 84 positioned in engagement with spring 78 and a nut 86. Nut 86 is used to adjust the tension of spring 78. Springs 77 and 78 serve as biasing means for biasing standard 12 to the earthworking position. The biasing means can be compressible rubber members, pneumatic cylinders, hydraulic cylinders.

Returning to FIG. 6, control member 59 has a second control pin 87 located below toggle link 56. Pin 87 moves with control member 59 and will break toggle assembly 52 when plow bottom 13 hits an obstruction, such as rock 88.

Referring to FIG. 7, plowshare point 15 has engaged a rock 88. The forward movement of the plow causes the plow bottom 13 and standard 12 to pivot upwardly about the pivot axis of pin 49. This moves arm 18 in a forward direction. Toggle link assembly 52 being in its extended position forces control member 59 to rotate in a forward direction, as indicated by the arrow 91. This moves second stop pin 87 in an upward direction into engagement with the bottom side of toggle link 56. Control member 59 moves against the biasing forces of springs 77 and 78. In the event that the plow bottom does not ride over rock 88, the force transmitted to control member 59 will cause control member 59 to continue to rotate in a direction of arrow 91. Second control pin 87 will then lift second toggle link 56 in an upward direction. This causes the center pivot pin 57 to move above the center line 66 whereby the toggle link 53 and 56 will move to a folded position, as shown in FIG. 8. As soon as links 53 and 56 fold, springs 77 and 78 move control member 59 in a rearward direction causing pin 64 to engage the top of link 56. This movement of control member 59 provides a spring movement gain of about 3 to 4 inches. This reduces the biasing effect of springs 77 and 78 on standard 12 so that the standard moves upwardly against a reduced amount of biasing force whereby plow bottom 13 readily rides over rock 88. In some cases, rock 88 will turn or pivot in an upward direction so that point 15 of the plow bottom must be elevated to a considerable height to ride over rock 88. The folded links 53 and 56 allow plow bottom 13 to pivot upward a considerable distance to allow point 15 to move over large rocks.

As soon as plowshare 14 passes over rock 88, springs 77 and 78 will move control member 59 in the rearward direction about pivot pin 61. First control pin 64 will engage the top of link 56. This causes standard 12 to pivot in a downward direction. The biasing force of springs 77 and 78 continue to act on toggle link 56 to return toggle links 53 and 56 to the extended overcenter position, as shown in FIG. 6, thereby locating the plow bottom 13 in its normal earthworking position.

Returning to FIG. 7, coulter disc 43 may also engage rock 88. Disc 43 moves in an upward direction against biasing force of spring 44, since crank member 37 pivots about pin 38. As soon as disc 43 passes over rock 88, spring 44 returns disc 43 to its normal ground cutting position.

While there has been shown and described the preferred embodiment of the earthworking tool and automatic trip and reset mechanism for allowing the tool to move upwardly over an obstruction, such as a rock, and returning the tool to its earthworking position, it is understood that changes in the structure, arrangement of structure, and materials can be made by those skilled in the art without departing from the invention.

The invention is defined in the following claims.

The embodiments of the invention in which an exclusive property or privilege is claimed are defined as follows:

1. An earthworking unit mountable on a beam comprising:
a mounting frame adapted for attachment to a beam, a standard, an earthworking tool mounted on the standard, means pivotally connecting the standard to the frame to allow the tool to move upwardly from a normal earthworking position, and trip and reset means for holding the tool in the earthworking position, allowing the tool to move over an object, and moving the tool back to the earthworking position after the tool has cleared the object, said trip and reset means including control means movably mounted on the frame, toggle link means pivotally connected to the control means and standard operable to hold the standard and tool in the earthworking position, said link means having a first link pivotally connected to the standard, a second link pivotally connected to the control means, pivot means pivotally connecting the first link to the second link, stop means limiting the over-center extended position of the toggle link means, said control means having first means engagable with the second link to move and hold the first and second links in generally aligned positions and second means engagable with the second link to move the first and second links toward a folded position, and biasing means connected to the control means and frame operable to yieldably hold the first means in engagement with the first link, said earthworking tool when moved into engagement with an object causes the control means to move against the holding force of the biasing means whereby the second means engages the second link to move the first and second links toward a folded position thereby allowing the tool to move up and over the object, said biasing means moving the first means into engagement with the second link after the tool passes over the object to move the first and second links to the generally aligned over-center position and the tool to the earthworking position.

2. The unit of claim 1 wherein: the standard has a downwardly directed section attached to the earthworking tool, a forward section pivotally connected to the frame, and an arm extended upwardly from the forward section, said toggle link means being connected to said arm.

3. The unit of claim 2 wherein: the forward section has a foward end, said frame having stop means engagable with the forward end when the tool is located in its earthworking position.

4. The unit of claim 1 wherein: the frame includes a pair of plate members, a pair of flanges secured to each plate member, each pair of flanges being locatable adjacent upper and lower sides of the beams, and clamp means operable to clamp the flanges to bhe beam.

5. The unit of claim 4 wherein: the standard has a forward section, stop means secured to the plate members adjacent the forward section, said forward section engagable with the stop means when the tool is located in its earthworking position.

6. The unit of claim 1 wherein: the control means is a crank means, first pivot means pivotally mounting the crank means on the frame, second pivot means connecting the second link to the crank means, and third means connecting the biasing means to the crank means.

7. The unit of claim 6 wherein: the first means is a first member fixed to the crank means above the second link, and the second means is a second member fixed to the crank means below the second link.

8. The unit of claim 1 including: pivot means pivotally mounting the control means on the frame, said first means being located above the second link whereby pivotal movement of the control means in one direction will move the first means into engagement with the top of the second link to move the toggle link means to the aligned position, said second means being located below the second link whereby pivotal movement of the control means in the direction opposite the one direction will move the second means into engagement with the bottom of the second link to move the toggle link means to the folded position.

9. The unit of claim 8 wherein: the frame includes upright anchor means connected to the biasing means, and means connecting the biasing means to the anchor means.

10. The unit of claim 9 wherein: the biasing means includes spring means, and means connecting the spring means to the control means.

11. The unit of claim 1 wherein: the frame includes anchor means connected to the biasing means, and means connecting the biasing means to the anchor means.

12. The unit of claim 11 wherein: the biasing means includes spring means, and means connecting the spring means to the control means.

13. The unit of claim 12 wherein: the spring means include a pair of compression springs, said anchor means include a pair of anchor arms, said means connecting the biasing means to the anchor means including pivot means mounting a spring to each anchor arm, said means connecting the spring means to the control means including a rod member for each spring.

14. The unit of claim 1 wherein: the frame has a pair of longitudinal flanges, and pivot means locating the control means between the flanges and pivotally connecting the control means thereto.

15. The unit of claim 1 including: a coulter located forward of the earthworking tool, biasing means yieldably moving the coulter toward an earthworking position, means pivotally mounting the coulter on the frame, and stop means mounted on the frame supporting the biasing means, said standard having a portion engagable with the stop means when the earthworking tool is in the earthworking position.

16. A trip mechanism for an earthworking tool comprising: a frame, a standard movably mounted on the frame and adapted to be connected to the earthworking tool, movable control means mounted on the frame, toggle link means connected to the control means and standard, said toggle link means having a first link pivotally connected to the standard, a second link pivotally connected to the control means, pivot means pivotally connecting the first and second links, stop means limiting the over-center extended position of the toggle link means, said control means having first means engagable with the second link to move and hold the first and second links in the over-center extended position, and second means engagable with the second link to move the first and second links toward a folded position thereby allowing the tool to move up from the earthworking position, and biasing means connected to the control means to bias the toggle link means to the over-center extended position and the tool to an earthworking position.

17. The trip mechanism of claim 16 wherein: the control means is a crank means, first pivot means pivotally mounting the crank means on the frame, second pivot means connecting the second link to the crank means, and third means connecting the biasing means to the crank means.

18. The trip mechanism of claim 17 wherein: the first means is a first member fixed to the crank means above the second link, and the second means is a second member fixed to the crank means below the second link.

19. The trip mechanism of claim 16 including: pivot means pivotally mounting the control means on the frame, said first means being located above the second link whereby pivotal movement of the control means in one direction will move the first means into engagement with the top of the second link to move the toggle link means to the aligned position, said second means being located below the second link whereby pivotal movement of the control means in the direction opposite the one direction will move the second means into engagement with the bottom of the second link to move the toggle link means to the folded position.

20. The trip mechanism of claim 16 wherein: the frame includes upright anchor means connected to the biasing means, and means connecting the biasing means to the anchor means.

21. The trip mechanism of claim 20 wherein: the biasing means includes spring means, and means connecting the spring means to the control means.

22. The trip mechanism of claim 16 wherein: the frame includes anchor means connected to the biasing means, and means connecting the biasing means to the anchor means.

23. The trip mechanism of claim 22 wherein: the biasing means includes spring means, and means connecting the spring means to the control means.

24. The trip mechanism of claim 23 wherein: the spring means include a pair of compression springs, said anchor means include a pair of anchor arms, said means conncting the spring means to the anchor means including pivot means mounting a spring to each anchor arm, said means connecting the spring means to the control means including a rod member for each spring.

25. The trip mechanism of claim 16 wherein: the frmae has a pair of longitudinal flanges, and pivot means locating the control means between the flanges and pivotally connecting the control means thereto.

26. A trip and reset mechanism for holding an earthworking tool in an earthworking position and allowing the tool to move up from the earthworking position and moving the tool back to the earthworking position, comprising: a frame, a standard, an earthworking tool mounted on the standard, means pivotally connecting the standard to the frame to allow the tool to move upwardly from a normal earthworking position control means movably mounted on the frame, toggle link means pivotally connected to the control means and standard operable to hold the standard and tool in the earthworking position, said control means having first means engagable with the toggle link means to move and hold the toggle link means in generally aligned position and second means engagable with the toggle link means to move the toggle link means toward a folded position, and biasing means connected to the control means and frame operable to yieldably hold the first means in engagement with the toggle link means, said earthworking tool when moved into engagement with an object causes the control means to move against the holding force of the biasing means whereby the second means engages the toggle link means to move the toggle link means toward a folded position thereby allowing the tool to move up and over the object, said biasing means moving the first means into engagement with the toggle link means after the tool passes over the object to move the toggle link means to the generally aligned over-center position and the tool to the earthworking position.

27. The mechanism of claim 26 wherein: the control means is a crank means, first pivot means pivotally mounting the crank means on the frame, second pivot means connecting the toggle link means to the crank means, and third means connecting the biasing means to the crank means.

28. The unit of claim 27 wherein: the first means is a first member fixed to the crank means above the toggle link means, and the second means is a second member fixed to the crank means below the toggle link means.

29. The unit of claim 26 including: pivot means pivotally mounting the control means on the frame, said first means being located above the toggle link means whereby pivotal movement of the control means in one direction will move the first means into engagement with the top of the toggle link means to move the toggle link means to the aligned position, said second means being located below the toggle link means whereby pivotal movement of the control means in the direction opposite the one direction will move the second means into engagement with the bottom of the toggle link means to move the toggle link means to the folded position.

30. The unit of claim 29 wherein: the frame includes upright anchor means connected to the biasing means, and means connecting the biasing means to the anchor means.

31. The unit of claim 30 wherein: the biasing means includes spring means, and means connecting the spring means to the control means.

32. The unit of claim 26 wherein: the frame includes anchor means connected to the biasing means, and means connecting the biasing means to the anchor means.

33. The unit of claim 32 wherein: the biasing means includes spring means, and means connecting the spring means to the control means.

34. The unit of claim 33 wherein: the spring means include a pair of compression springs, said anchor means include a pair of anchor arms, said means connecting the biasing means to the anchor means including pivot means mounting a spring to each anchor arm, said means connecting the spring means to the control means including a rod member for each spring.

35. The unit of claim 26 wherein: the frame has a pair of longitudinal flanges, and pivot means locating the control means between the flanges and pivotally connecting the control means thereto.

36. A trip mechanism comprising: a frame, a standard movably mounted on said frame, movable control means mounted on the frame, toggle link means movably mounted on the control means and standard, said control means having first means engagable with the toggle link means to move and hold the toggle link means in the over-center extended position, and second means engagable with the toggle link means to move the toggle link means toward a folded position thereby allowing the standard to move up from the earthworking position, and biasing means connected to the control means to bias the toggle link means to the over-center extended position and the standard to an earthworking position.

37. The trip mechanism of claim 36 wherein: the control means is a crank means, first pivot means pivotally mounting the crank means on the frame, second pivot means connecting the second link to the crank means, and third means connecting the biasing means to the crank means.

38. the trip mechanism of claim 37 wherein: the first means is a first member fixed to the crank means above the toggle link means and the second means is a second member fixed to the crank means below the toggle link means.

39. The trip mechanism of claim 36 including: pivot means pivotally mounting the control means on the frame, said first means being located above the toggle link means whereby pivotal movement of the control means in one direction will move the first means into engagement with the top of the toggle link means to move the toggle link means to the aligned position, said second means being located below the toggle link means whereby pivotal movement of the control means in the direction opposite the one direction will move the second means into engagement with the bottom of the toggle link means to move the toggle link means to the folded position.

40. The trip mechanism of claim 36 wherein: the frame includes upright anchor means connected to the biasing means, and means connecting the biasing means to the anchor means.

41. The trip mechanism of claim 40 wherein: the biasing means includes spring means, and means connecting the spring means to the control means.

42. The trip mechanism of claim 36 wherein: the frame includes anchor means connected to the biasing means, and means connecting the biasing means to the anchor means.

43. The trip mechanism of claim 42 wherein: the biasing means includes spring means, and means connecting the spring means to the control means.

44. The trip mechanism of claim 43 wherein: the spring means include a pair of compression springs, said anchor means include a pair of anchor arms, said means connecting the biasing means to the anchor means including pivot means mounting a spring to each anchor arm, said means connecting the spring means to the control means including a rod member for each spring.

45. The trip mechanism of claim 36 wherein: the frame has a pair of longitudinal flanges, and pivot means locating the control means between the flanges and pivotally connecting the control means thereto.

* * * * *